US010555202B1

(12) United States Patent
Narayanan et al.

(10) Patent No.: US 10,555,202 B1
(45) Date of Patent: Feb. 4, 2020

(54) METHODS, SYSTEMS, AND COMPUTER READABLE MEDIA FOR MONITORING INTERNET OF THINGS (IOT) DEVICE STATE THROUGH SERVICE CAPABILITY EXPOSURE FUNCTION (SCEF)

(71) Applicant: Oracle International Corporation, Redwood Shores, CA (US)

(72) Inventors: Gokul Narayanan, Kerala (IN); Shashikiran Bhalachandra Mahalank, Bangalore (IN); Rajiv Krishan, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/280,672

(22) Filed: Feb. 20, 2019

(51) Int. Cl.
*H04W 24/10* (2009.01)
*H04W 8/22* (2009.01)
*H04W 88/06* (2009.01)

(52) U.S. Cl.
CPC ............. *H04W 24/10* (2013.01); *H04W 8/22* (2013.01); *H04W 88/06* (2013.01)

(58) Field of Classification Search
CPC ......... H04W 4/70; H04W 8/04; H04W 12/06; H04W 88/16; H04L 12/2803; H04L 41/022; H04L 43/065; H04L 67/12; H04L 67/20
See application file for complete search history.

(56) References Cited

U.S. PATENT DOCUMENTS

| 8,023,482 | B2 | 9/2011 | Gong et al. | |
|---|---|---|---|---|
| 10,104,567 | B2* | 10/2018 | Kodaypak | H04W 4/70 |
| 10,212,639 | B2* | 2/2019 | Kodaypak | H04W 76/10 |
| 10,375,530 | B2* | 8/2019 | Buckley | H04W 4/06 |
| 2015/0016266 | A1 | 1/2015 | Dumitrescu et al. | |

(Continued)

OTHER PUBLICATIONS

3rd Generation Partnership Project; Technical Specification Group Services and System Aspects; Architecture enhancements to facilitate communications with packet data networks and applications, 3GPP TS 23.682 v16.1.0, Dec. 2018, pp. 1-126 (Year: 2018).*

(Continued)

*Primary Examiner* — Matthew C Sams
(74) *Attorney, Agent, or Firm* — Jenkins, Wilson, Taylor & Hunt, P.A.

(57) ABSTRACT

A method for monitoring IoT device state includes, in an SCEF implemented using at least one processor. The method includes providing a common interface for receiving subscription requests from IoT ASs and SCSs for monitoring state of IoT devices of plural different generation networks. The method further includes maintaining, in the SCEF, a database of identifiers of IoT devices of a first-generation network, providing, in the SCEF, an interface to a subscriber data repository node of the first-generation network, and receiving, via the common interface, a subscription request for subscribing to receive updates in state information for an IoT device. The method further includes performing a lookup in the database and identifying the subscription request as being associated with an IoT device registered in the first-generation network and transmitting a message to the subscriber data repository node of the first-generation network for receiving state information regarding the IoT device.

20 Claims, 8 Drawing Sheets

(56) References Cited

U.S. PATENT DOCUMENTS

| | | | |
|---|---|---|---|
| 2015/0110000 A1* | 4/2015 | Zhang | H04W 8/04 370/328 |
| 2015/0263987 A1 | 9/2015 | Klein et al. | |
| 2016/0164788 A1 | 6/2016 | Goel et al. | |
| 2016/0315743 A1 | 10/2016 | Nagaraj et al. | |
| 2016/0373591 A1* | 12/2016 | Sharma | H04L 12/1407 |
| 2017/0195822 A1* | 7/2017 | Watfa | H04W 4/08 |
| 2017/0347283 A1* | 11/2017 | Kodaypak | H04W 4/70 |
| 2018/0035351 A1* | 2/2018 | Kodaypak | H04W 76/10 |
| 2018/0249281 A1 | 8/2018 | Mccann | |
| 2018/0324671 A1* | 11/2018 | Palnati | H04L 63/0876 |
| 2019/0007329 A1* | 1/2019 | Velev | H04L 47/266 |
| 2019/0141527 A1* | 5/2019 | Krishan | H04W 4/70 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).

"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).

"Diameter Signaling Router SCEF User's Guide," Release 8.3, E93572, Oracle® Communications, pp. 1-110 (Sep. 2018).

"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).

Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).

Commonly-assigned, co-pending U.S. Appl. No. 16/415,758 for "Methods, Systems, and Computer Readable Media for Providing Reduced Signaling Internet of Things (Iot) Device Monitoring," (Unpublished, filed May 17, 2019).

Commonly-assigned, co-pending U.S. Appl. No. 16/399,428 for "Methods, Systems, and Computer Readable Media for Monitoring Lightweight Machine to Machine (LWM2M) Internet of Things (IoT) Devices Through Service Capability Exposure Function (SCEF) T8 Interface," (Unpublished, filed Apr. 30, 2019).

"Class of Service Feature Guide (Routers and EX9200 Switches)," Junos® OS, Juniper Networks, pp. 1-1530 (Apr. 10, 2019).

"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).

"3rd Generation Partnership Project; Technical Specification Group Core Network and Terminals; Home Subscriber Server (HSS) diameter interfaces for intenNorking with packet data networks and applications (Release 15)," 3GPP TS 29.336, V15.6.0, pp. 1-79 (Mar. 2019).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).

"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).

"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).

Commonly-assigned, co-pending U.S. Appl. No. 16/287,808 for "Methods, Systems, and Computer Readable Media for Dynamically Provisioning and Using Public Land Mobile Network (PLMN) Location Mappings in Sevice Capability Exposure Function (SCEF) or Network Exposure Function (NEF)," (Unpublished, filed Feb. 27, 2019).

"OMA Lightweight Machine to Machine Requirements," Candidate Version 1.2, Open Mobile Alliance, pp. 1-20 (Jan. 24, 2019).

"Oracle Communications Diameter Signaling Router," Release Notice, Release 8.3, E93179 Revision 02, Oracle, pp. 1-98 (Dec. 2018).

"3rd Generation Partnership Project; Technical Specification Group Core Network and Terminals; Home Subscriber Server (HSS) diameter interfaces for intenNorking with packet data networks and applications (Release 15)," 3GPP TS 29.336, V15.5.0, pp. 1-74 (Dec. 2018).

"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).

"Addressing 5G Network Function Requirements," Intel® FPGAs and Intel PAC 5G QoS and IPSec Benchmarking, White Paper, pp. 1-8 (Oct. 2018).

"3rd Generation Partnership Project; Technical Specification Group Services and System Aspects; Universal Geographical Area Description (GAD) (Release 15)," 3GPP TS 23.032, V15.1.0, pp. 1-32 (Sep. 2018).

"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).

"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).

"Lightweight Machine to Machine Technical Specification: Transport Bindings," Candidate Version: 1.1, Open Mobile Alliance, pp. 1-67 (Jun. 12, 2018).

"Lightweight Machine to Machine Technical Specification: Core," Candidate Version: 1.1, Open Mobile Alliance, pp. 1-142 (Jun. 12, 2018).

Mayer, Georg (Huawei), "3GPP 5G CoreNetwork Status," 3GPP a Global Initiative, pp. 1-23 (Nov. 2017).

Benacer et al., "A High-Speed Traffic Manager Architecture for Flow-Based Networking," pp. 1-4 (2017).

Bormann et al., "Block-Wise Transfers in the Constrained Application Protocol (CoAP)," RFC 7959, pp. 1-37 (Aug. 2016).

"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).

Hartke, "Observing Resources in the Constrained Application Protocol (CoAP)," RFC 7641, pp. 1-30 (Sep. 2015).

Shelby et al., "The Constrained Application Protocol (CoAP)," RFC 7252, pp. 1-112 (Jun. 2014).

\* cited by examiner

METHODS, SYSTEMS, AND COMPUTER READABLE MEDIA FOR MONITORING INTERNET OF THINGS (IOT) DEVICE STATE THROUGH SERVICE CAPABILITY EXPOSURE FUNCTION (SCEF)

TECHNICAL FIELD

The subject matter described herein relates to monitoring IoT device state. More particularly, the subject matter described herein relates to monitoring IoT device state by providing a common interface for monitoring IoT devices of different generation networks.

BACKGROUND

The Third Generation Partnership Project (3GPP) defines machine type communication (MTC) monitoring procedures that allow IoT application servers (ASs) and service capability servers (SCSs) to monitor the state of 4G IoT devices. Examples of state that can be monitored include location information, roaming status, device reachability, etc. However, current 3GPP-defined procedures do not enable an IoT application server or service capability server to monitor the device state of IoT devices of or connected to 2G and 3G networks.

One possible solution to this problem would be to provide one interface for allowing IoT application servers to subscribe to receive 4G IoT device state and providing a separate interface for allowing IoT application servers to subscribe to receive 2G or 3G IoT device state. Such a solution would require IoT application servers and service capability servers to comply with the requirements of different interfaces depending on the type of IoT device being monitored and is therefore undesirable.

Accordingly, there exists a need for improved methods, systems, and computer readable media for monitoring IoT device state.

SUMMARY

The subject matter described herein includes methods, systems, and computer readable media for monitoring IoT device state. One method includes, in a service capability exposure function (SCEF) implemented using at least one processor, providing a common interface for receiving subscription requests from IoT application servers (ASs) or service capability servers (SCSs) for monitoring state of IoT devices of plural different generation networks.

The phrases "IoT devices of plural different generation networks" and "IoT devices of different generation networks" refer to IoT devices that are attached to and operate in different generations of networks, for the generations of networks defined by the 3GPP. For example, a 2G network may be a network of one generation. A 3G network may be another network of another generation. A 4G network may be a network of yet another generation. A 5G network may be a network of yet another generation. In general, the common interface provided by the SCEF allows monitoring event subscriptions for IoT devices attached to n generation networks and IoT devices attached to m generation networks, where n and m are integers and are not equal.

The method further includes maintaining, in the SCEF, a database of identifiers of IoT devices of a first-generation network. The method further includes providing, in the SCEF, an interface to a subscriber data repository node of the first-generation network. The method further includes receiving, via the common interface, a subscription request for subscribing to receive state information regarding an IoT device. The method further includes performing a lookup in the database and identifying the subscription request as being associated with an IoT device registered in the first-generation network. The method further includes transmitting, via the interface to the first-generation network, a message to the subscriber data repository node for receiving state information regarding the IoT device.

In one example, the common interface comprises a T8 interface, the first generation network comprises a 2G or 3G network, the T8 interface is further configured to receive subscription requests for state information regarding a 4G or 5G IoT device, and wherein the method further comprises, transmitting, via an interface to a second generation network, a message to a node in the second generation network for subscribing to receive state information regarding the 4G or 5G IoT device.

In another example, providing the database includes providing a database indexed by mobile subscriber integrated services digital network (MSISDN) numbers or domain parts of external identifiers.

In yet another example, the subscriber data repository node comprises a home location register (HLR).

In yet another example, transmitting the message to the subscriber data repository node comprises transmitting an anytime interrogation (ATI) request message to the data repository node.

In yet another example, the subscription request is a request for one-time monitoring and wherein the ATI request message includes an information element indicating one-time monitoring.

In yet another example, the subscription request is a request for continuous monitoring and wherein the ATI request message includes an information element indicating continuous monitoring.

In yet another example, a timer is maintained at the SCEF. The SCEF periodically sends ATI request messages to the subscriber data repository node upon each expiration of the timer to effect the continuous monitoring.

In yet another example, the SCEF receives state information regarding the IoT device and providing the state information to the SCS or AS via the common interface.

In yet another example, the SCEF comprises a standalone node or a component of a Diameter signaling router (DSR) or a policy server.

A system for monitoring IoT device state includes a service capability exposure function (SCEF). The SCEF includes at least one processor. The SCEF further includes a common interface for receiving subscription requests from IoT application servers (ASs) or service capability servers (SCSs) for monitoring state of IoT devices of plural different generation networks. The SCEF further includes a database of identifiers of IoT devices of a first-generation network. The SCEF further includes an interface to a subscriber data repository node of the first-generation network. The SCEF receives, via the common interface, a subscription request for subscribing to receive state information regarding an IoT device, performs a lookup in the database and identifying the subscription request as being associated with an IoT device registered in the first-generation network, and transmits, via the interface to the first-generation network, a message to the subscriber data repository node for receiving state information regarding the IoT device.

According to another aspect of the subject matter described herein, a non-transitory computer readable medium having stored thereon executable instructions that when executed by a processor of a computer controls the computer to perform steps. The steps include, in a service capability exposure function (SCEF) implemented using at least one processor. The steps further include providing a common interface for receiving subscription requests from IoT application servers (ASs) or service capability servers (SCSs) for monitoring state of IoT devices of plural different generation networks. The steps further include maintaining, in the SCEF, a database of identifiers of IoT devices of a first-generation network. The steps further include providing, in the SCEF, an interface to a subscriber data repository node of the first-generation network; receiving, via the common interface, a subscription request for subscribing to receive state information regarding an IoT device. The steps further include performing a lookup in the database and identifying the subscription request as being associated with an IoT device registered in the first-generation network. The steps further include transmitting, via the interface to the first-generation network, a message to the subscriber data repository node for receiving state information regarding the IoT device.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
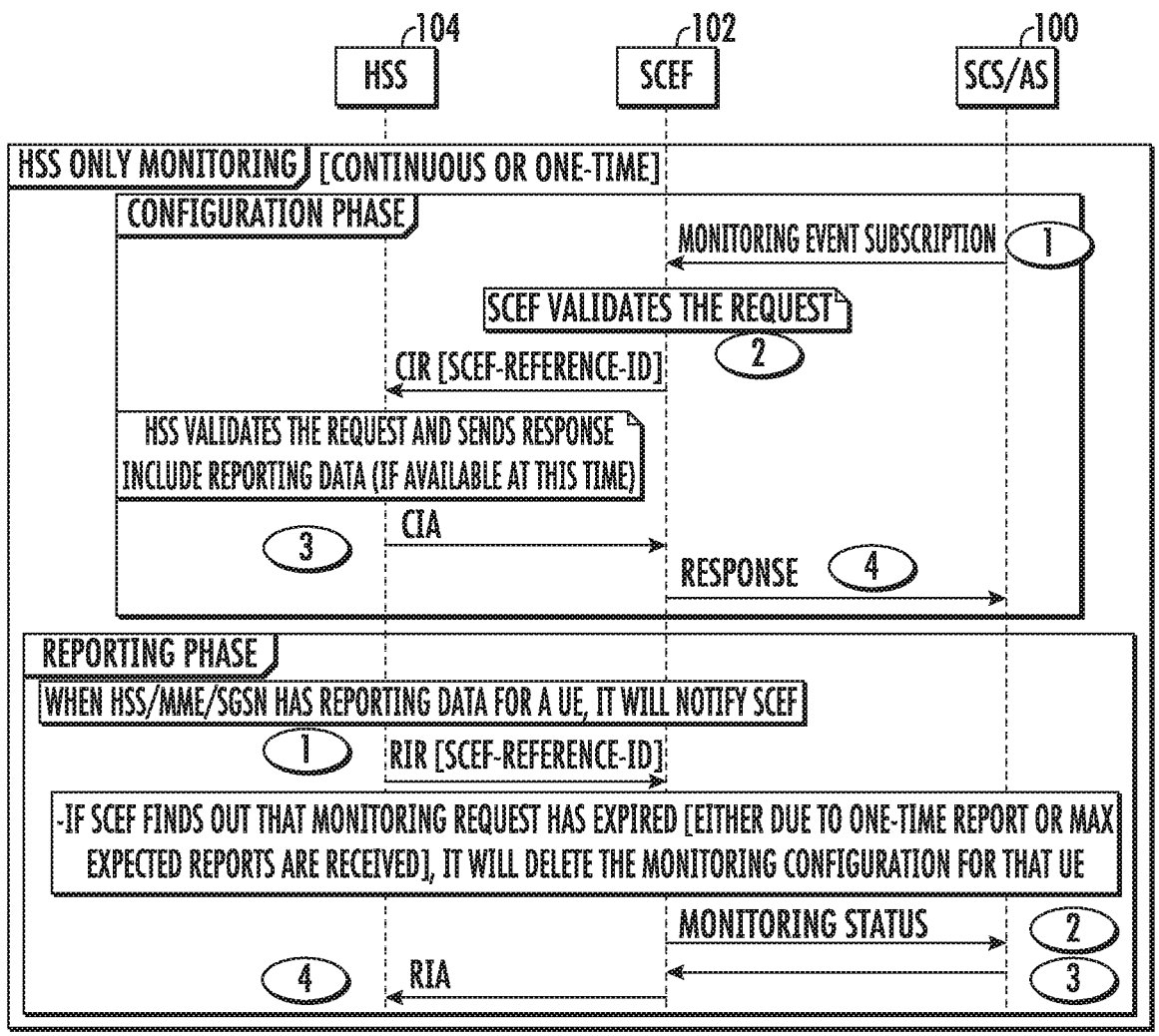
FIG. 1 is a message flow diagram illustrating an exemplary message flow for using the T8 interface to subscribe to receive IoT device state for 4G IoT devices when the home subscriber server (HSS) includes the requested state information.

The subject matter described herein includes an SCEF that provides a common interface for IoT application servers to subscribe to receive IoT device state information for IoT devices of different generation networks. In one example, the common interface may be the T8 interface specified in 3GPP standards documents where IoT ASs and SCSs subscribe to receive updates in state information for 4G IoT devices. However, the procedures specified for subscribing to receive updates is currently only valid for 4G IoT devices. The subject matter described herein uses the same interface to allow subscriptions to receive updates for IoT devices of different generation networks, including 2G and 3G network attached IoT devices. The T8 interface may also be used for 3GPP ASs and SCSs to subscribe to and receive state information updates for 5G IoT devices.

Providing a common interface for ASs and SCSs to subscribe to and receive updates in state information for IoT devices of different generation networks is advantageous over an approach that requires separate interfaces for subscribing to receive updates in IoT state information for IoT devices of different generation networks. For example, if one interface is provided for subscribing to receive updates in state information for 2G and 3G IoT devices, and another interface is provided for subscribing to receive updates in state information for 4G IoT devices, then each SCS or AS is required to implement both interfaces and to know the type of network (e.g., 2G, 3G, or 4G) to which an IoT device is attached. Requiring SCSs and ASs to implement different interfaces for subscribing to and receiving state information for IoT devices of different generation networks is inefficient in light of the expected numbers of SCS and AS devices relative to the number of SCEF devices.

An SCEF that receives, via a common interface, subscription requests for state information for plural generation IoT devices is a technological improvement over requiring every SCS and AS to implement separate interfaces for obtaining state information for IoT devices of different generation networks, because the common interface is only required to be implemented at a single location, i.e., at the SCEF versus implementing separate subscription interfaces at each SCS and AS. The SCEF is also in a better position than the SCS or the AS from a security and efficiency standpoint to know the type of network to which each IoT device is attached. For example, a network operator can provision a database in the SCEF that indicates the type of network to which each IoT device is attached so that requests for state information can be sent to the proper network. The network operator may also wish to control access to IoT device state by limiting access to SCSs and ASs from authorized networks. Using an interface at the SCEF to access IoT device state allows the SCEF to be used as a security checkpoint to allow or deny incoming subscription requests for IoT device state information.

FIG. 1 is a message flow diagram illustrating the 4G machine type communication monitoring event configuration message flow that can be implemented by an SCEF as described herein for monitoring the state of 4G devices. The message flow illustrated in FIG. 1 is for HSS only monitoring, either continuous or one time, where the HSS is contacted by the SCEF on behalf of the SCS or AS to provide IoT device state information.

The interface used by between the SCEF and the SCS/AS for setting up a subscription and providing state information regarding an IoT device is referred to as the T8 interface. The T8 interface is defined in 3GPP TS 29.122, Technical Specification Group Core Network and Terminals; T8 reference point for Northbound APIs; (Release 15) (December 2018), the disclosure of which is incorporated herein by reference in its entirety. According to 3GPP TS 29.122, the T8 interface or reference point is an interface between the SCS/AS and the SCEF. The term "SCS/AS" refers to the SCS and/or the AS, because in some cases, the AS interacts directly with the SCEF and in other cases, the AS interacts with the SCEF through the SCS.

One purpose of the T8 interface specific in 3GPP TS 29.122 is "monitoring procedures." The monitoring procedure through with the SCS/AS can subscribe to receive information regarding 4G IoT devices is called the monitoring event configuration procedure. Rather than implementing a new interface and a new procedure on the SCS/AS side, the same interface and the same procedure may be used by the SCS and AS to configure the SCEF and downstream elements to monitor and report the state of 2G and 3G IoT devices. The 4G message flow will first be described, followed by a description of the 2G/3G call flow.

Referring to the 4G message flow illustrated in FIG. 1, the message flow is divided into a configuration or subscription phase and a reporting phase. In line 1 of the configuration phase, an SCS/AS 100 sends a monitoring event subscription message to an SCEF 102. The monitoring event subscription message may be sent to SCEF 102 via the T8 interface or reference point of SCEF 102. The monitoring event subscription request contains the type of event requested and an identifier for the UE. Examples of events that might be requested include request for location information, UE reachability, or changes in international mobile station identity (IMSI) to international mobile equipment identity (IMEI) mappings. The monitoring event subscription request may also include the SCS/AS identifier and the monitoring event type. Examples of monitoring event types include one-time reporting and continuous monitoring for a specified duration. The monitoring event subscription request message may be sent to SCEF 102 in a hypertext transfer protocol (HTTP) post message.

In line 2 of the configuration phase, SCEF 102 validates the monitoring event subscription request and sends a Diameter connection information request (CIR) message to home subscriber server (HSS) 104 over the S6t interface. The CIR message includes a unique SCEF reference ID generated for the user.

Validating the monitoring event subscription request may include determining whether the sending SCS/AS is authorized to monitor state information for a particular IoT device. If the SCS/AS is not authorized to monitor state information for the IoT device, SCEF 102 may reject the monitoring event subscription request. In the example illustrated in FIG. 1, it is assumed that the monitoring event request is from an SCS/AS that is authorized to monitor state information for the IoT device identified in the monitoring event request message.

In line 3 of the configuration phase, HSS 104 validates the request and sends a response including IoT device state information, if the information is available. The response is a Diameter connection information answer (CIA) message and is transmitted to SCEF 102 via the S6t interface. In line 4 of the message flow diagram, SCEF 102 sends an HTTP response 201 to SCS/AS 100. The response indicates that the subscription to receive state information has been accepted. Once the subscription to receive state information has been accepted, the subscription or configuration phase of the monitoring event procedure ends.

HSS 104, after receiving the CIR containing the subscription information, will wait until monitoring data is available for the UE. Once monitoring data is available, HSS 104 will send the requested information to the SCEF 102. In line 1 of the reporting phase of the message flow diagram, HSS 104 sends a Diameter routing information request (RIR) message to SCEF 102 that includes the requested state information and the SCEF reference ID. If SCEF 102 determines that the monitoring request has expired either due to the generation of a one-time report (in the case of one-time reporting) or the expiration of a report duration or receipt of a specified number of reports (in the case of continuous reporting), SCEF 102 will delete the monitoring configuration for the UE.

In line 2 of the reporting phase of the message flow diagram, SCEF 102 communicates the IoT device state to SCS/AS 100. The device state information is communicated to SCS/AS 100 via the T8 interface or reference point.

In line 3 of the reporting phase of the message flow diagram, SCS/AS 100 sends a response over the T8 interface to SCEF 102 with a cause code indicating success. In line 4 of the reporting phase of the message flow diagram, SCEF 102 sends a Diameter routing information answer (RIA) message to the HSS indicating success.

Figure 2:
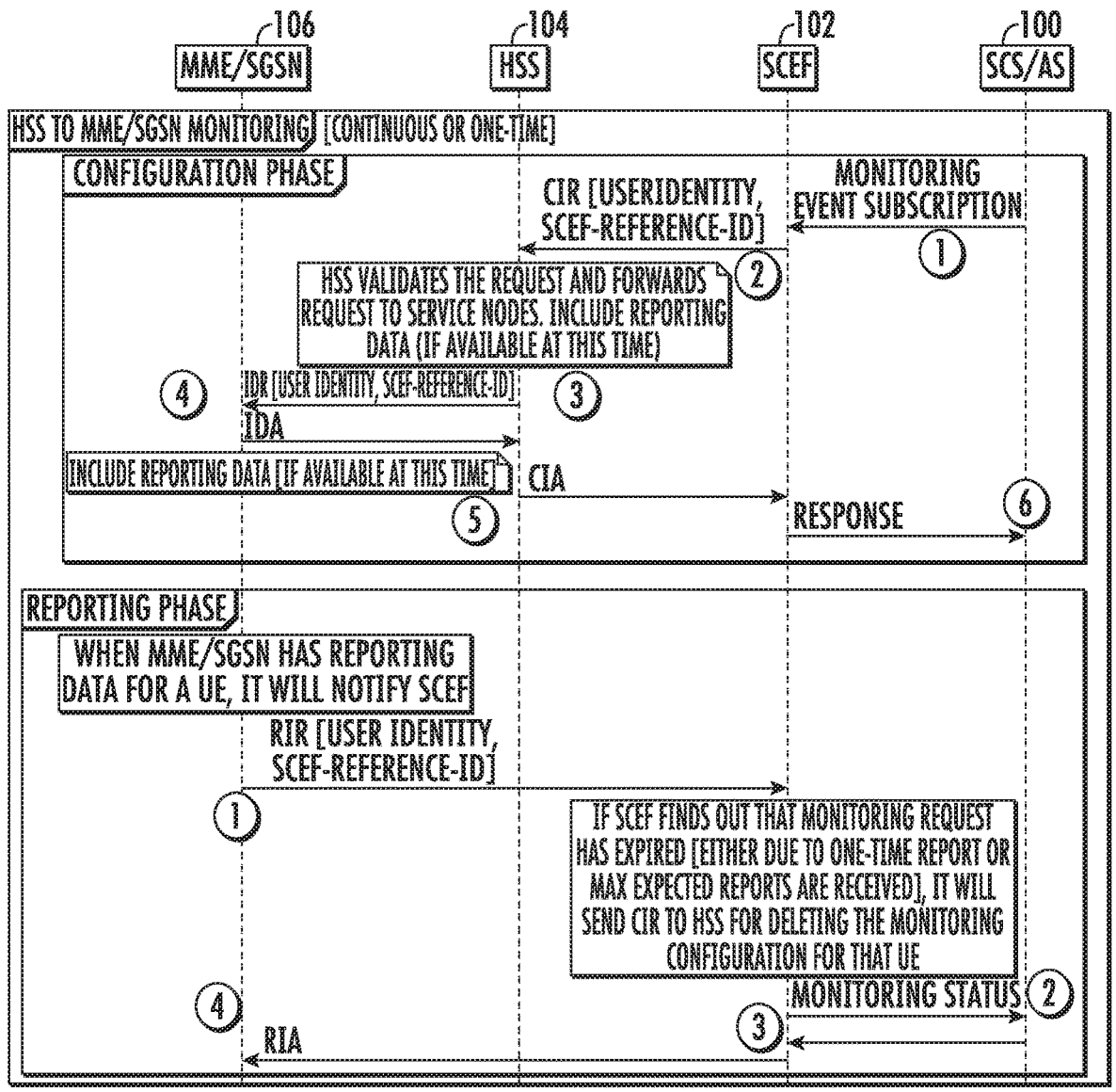
FIG. 2 is a message flow diagram illustrating exemplary messaging exchanged for subscribing to receive IoT device state for 4G IoT devices when the HSS does not include the requested state information.

In FIG. 1, it is assumed that the HSS has the requested IoT device state information. In another example, the HSS may not have the requested IoT device state information and may contact a mobility management entity (MME) or a serving general packet radio service support node (SGSN) to obtain the requested IoT device state information. FIG. 2 is a message flow diagram illustrating the monitoring event configuration procedure and reporting procedure for obtaining 4G IoT device state information from an MME or an SGSN.

Referring to FIG. 2, like FIG. 1, the message flow is divided into a configuration phase and a subscription or reporting phase. In line 1 of the configuration phase, SCS/AS 100 sends a monitoring event subscription message to SCEF 102. The monitoring event subscription message may be sent to SCEF 102 via the T8 interface or reference point of SCEF 102. The monitoring event subscription request contains the type of event requested and an identifier for the UE. Examples of events that might be requested include request for location information, UE reachability, or changes in IMSI to IMEI mappings. The monitoring event subscription request may also include the SCS/AS identifier and the monitoring event type. Examples of monitoring event types include one-time reporting and continuous monitoring for a specified duration. The monitoring event request message may be sent to SCEF 102 in an HTTP post message.

In line 2 of the configuration phase, SCEF 102 validates monitoring event request and sends a Diameter CIR message to HSS 104 over the S6t interface. The CIR message includes a unique SCEF reference ID generated for the user. Validating the monitoring event request may include determining whether the sending SCS/AS is authorized to monitor state information for a particular IoT device. If the SCS/AS is not authorized to monitor state information for the IoT device, SCEF 102 may reject the monitoring event request. In the example illustrated in FIG. 2, it is assumed that the monitoring event request is from an SCS/AS that is authorized to monitor state information for the IoT device identified in the monitoring event request message.

In line 3 of the configuration phase, HSS 104 validates the request, forwards the request to IoT device service nodes, such as MME/SGSN 106, and reports any IoT device state information available to SCEF 102. The request from HSS 104 to MME/SGSN 106 is carried in a Diameter insert subscriber data request (IDR) message. MME/SGSN 106 responds with a Diameter insert subscriber data answer (IDA) message indicating that the request for a monitoring subscription has been accepted and includes, in the IDA message, any available IoT device state information. In line 5 of the configuration phase, HSS 104 receives the IDA message and sends a CIA message to SCEF 102 indicating successful configuration of the monitoring of the IoT device. In line 6 of the configuration phase, SCEF 102 sends an HTTP response 201 to SCS/AS 100. The response indicates that the subscription to receive state information has been accepted. Once the subscription requested to receive state information has been accepted, the subscription or configuration phase of the monitoring event procedure ends.

During the reporting phase, when MME/SGSN 106 has state information to report for an IoT device, MME/SGSN 106 notifies SCEF 102. In FIG. 2, the notification is transmitted in line 1 of the reporting phase from MME/SGSN 106 to SCEF 102 in a Diameter RIR message. The Diameter RIR message includes the requested state information and the SCEF reference ID. If the SCEF determines that the monitoring request has expired either due to receipt a one-time report (in the case of one-time reporting) or expiration of a subscription duration or receipt of a specified number of reports (in the case of continuous reporting), SCEF 102 will delete the monitoring configuration for the IoT device.

In line 2 of the reporting phase of the message flow diagram, SCEF 102 communicates the IoT device state to SCS/AS 100. The device state information is communicated to SCS/AS 100 via the T8 interface or reference point.

In line 3 of the reporting phase of the message flow diagram, SCS/AS 100 sends a response over the T8 interface to SCEF 102 with a cause code indicating success. In line 4 of reporting phase of the message flow diagram, SCEF 102 sends a Diameter RIA message to the HSS indicating success.

Figure 3:
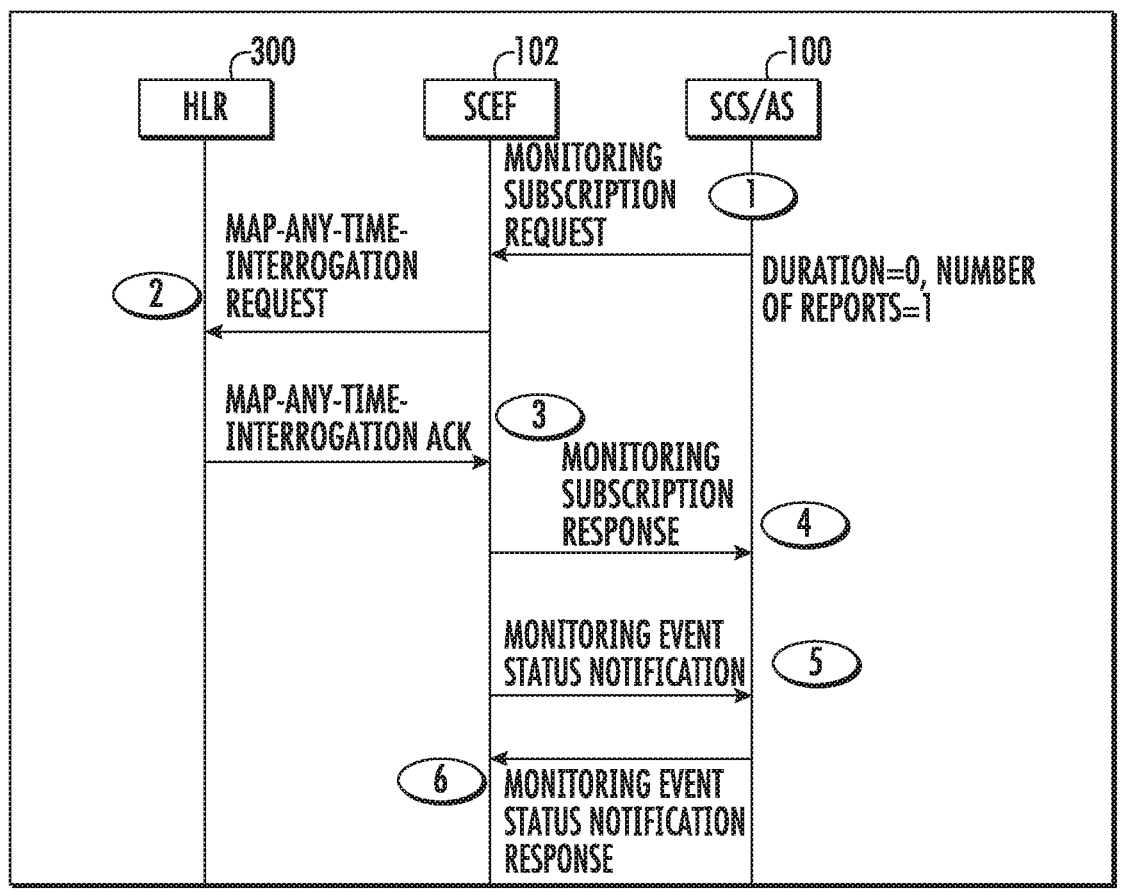
FIG. 3 is a message flow diagram illustrating exemplary messaging for subscribing to receive 2G or 3G IoT device state where the monitoring event subscription is for a single event monitoring.

In the example illustrated in FIGS. 1 and 2, the T8 interface and monitoring event configuration procedure is used to configure downstream devices (i.e., the SCEF, the HSS, and the MME/SGSN) to monitor IoT device state for 4G IoT devices. As stated above, the T8 interface and the monitoring event configuration procedure may also be used to configure downstream devices to monitor and report device state information for non-4G IoT devices, including 2G and 3G IoT devices. FIG. 3 is a message flow diagram illustrating the use of the T8 interface and the monitoring event configuration procedure to configure downstream devices to monitor and report status of 2G and 3G IoT devices. The message flow in FIG. 3 is for one-time monitoring. Referring to FIG. 3, in line 1 of the message flow diagram, SCS/AS 100 sends a monitoring subscription request to SCEF 102 over the T8 interface. In this example, the request is for one time monitoring. Accordingly, the monitoring duration parameter in the monitoring subscription request may be set to zero or the number of reports parameter may be set to 1.

In line 2 of the message flow diagram, SCEF 100 validates the monitoring subscription request and determines, based on the device identifier present in the monitoring subscription request message, that the device is a 2G/3G IoT device, and sends a mobile application part (MAP) anytime interrogation (ATI) request message to home location register (HLR) 300. As will be described in more detail below, SCEF 102 may maintain a database of device identifiers for 2G/3G IoT devices. The device identifiers may be ranges of MSISDNs or domain identifiers of external IDs mapped to HLRs or HLR/HSSs that maintain state information for 2G and 3G IoT devices. SCEF 102 may insert in the MAP ATI request message one or more information elements (IEs) that identify the message as an IoT device state information subscription request and the type of subscription requested. SCEF 102 may determine the monitoring event type based on the monitoring event type received in the monitoring subscription request. The following table contains mappings between monitoring event subscription types and information elements that may be included in the MAP ATI request message.

TABLE 1

IoT Monitoring Subscription Type to
MAP ATI Information Element Mappings

| T8 Monitoring Subscription Type | MAP ATI IE |
| --- | --- |
| Location Reporting | Location Information-used for one time reporting Current location-used for continuous reporting |
| UE Reachability | Subscriber State |
| Change of IMSI-IMEI (SV) Association | IMEI (with software version) |

From Table 1, if the monitoring event type is location reporting, SCEF 102 may include the location information element in the ATI request message for one time reporting and the current location information element for continuous reporting. If the SCS/AS requests notifications regarding UE reachability, SCEF 102 may include the subscriber state IE in the MAP ATI request message. If the SCS/AS requests to be notified of changes in IMSI-IMEI association, SCEF 102 may include the IMEI information element in the ATI request message. Any other monitoring type coming from SCS/AS for 2G/3G devices may be rejected by SCEF 102 with proper error cause.

In line 3 of the message flow diagram, HLR 300 responds to the ATI request by sending a MAP ATI acknowledgement (Ack) message to SCEF 102 indicating a successful subscription to the 2G or 3G IoT device state information. In line 4, SCEF 102 sends a monitoring event subscription response to SCS/AS 100 with http cause 201 created. After line 4, the configuration or subscription phase for receiving the 2G or 3G IoT device state is complete.

During the reporting phase, in line 5 of the message flow diagram, SCEF 102 sends a monitoring event status notification to SCS/AS 100 with the requested monitoring information over T8 interface. In line 6 of the message flow diagram, SCS/AS 100 sends a monitoring event status notification response to SCEF 102.

Figure 4:
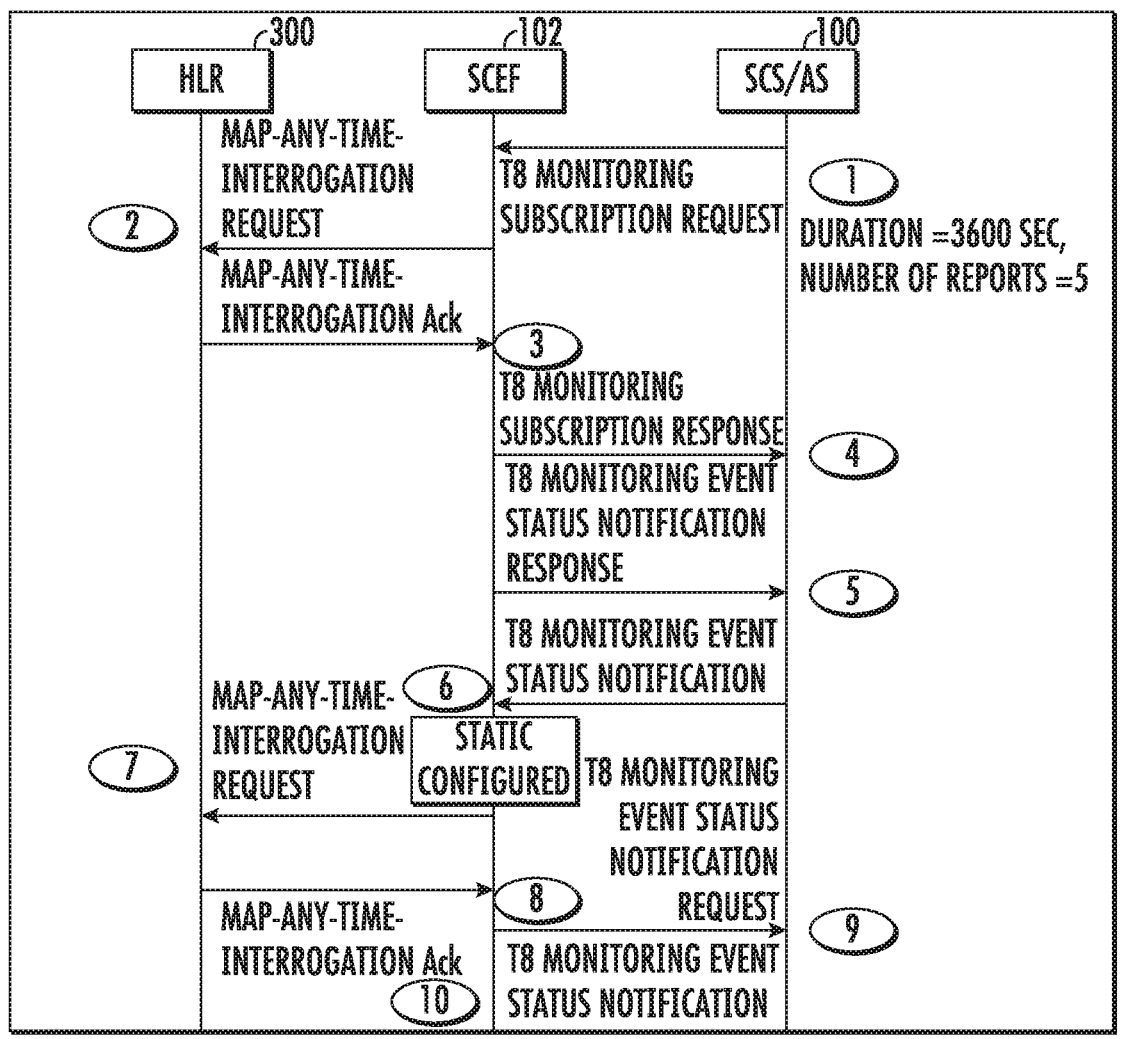
FIG. 4 is a message flow diagram illustrating exemplary messaging for subscribing to receive 2G or 3G IoT device state where the monitoring event subscription is for continuous monitoring.

In the example in FIG. 3, the monitoring subscription request is for one-time monitoring. SCEF 102 may also provide for continuous monitoring of state information regarding 2G and 3G IoT devices. FIG. 4 is a message flow diagram illustrating exemplary steps performed by SCEF 102 for continuous monitoring of state information regarding 2G and 3G IoT devices. Referring to FIG. 4, in line 1, SCS/AS 100 sends a monitoring subscription request to SCEF 102 over the T8 interface. The monitoring subscription request may contain a non-zero monitoring duration parameter or a number of reports parameter that is greater than one, either of which indicates continuous monitoring of an IoT device.

In line 2 of the message flow diagram, SCEF 102 validates the monitoring subscription request message and, based on the target IoT device identifier present in the T8 message, SCEF 102 determines the device is a 2G or 3G IoT device and sends a MAP ATI request to HLR 300. As stated above, SCEF 102 may include a database of device identifiers for 2G/3G IoT devices and corresponding HLR addresses. Table 2 shown below is an example of an IoT device identifier database that may be present in SCEF 102.

TABLE 2

IoT Device Identifier Database

| IoT Device ID | 2G/3G HLR Address |
|---|---|
| 9194930000-9194939999 | HLR1 |
| 9194934000-9194934999 | HLR2 |
| 2G_3GIoT.vzw.com | HLR4 |
| 2G_3GIoT.att.com | HLR5 |

Table 2 includes a list of IoT device IDs and corresponding 2G/3G HLR addresses. In the illustrated example, IoT devices are identified by ranges of MSISDN numbers and by the domain part of the external identifier in IoT device monitoring event subscription request messages. When SCEF 102 receives a monitoring event subscription request message, SCEF 102 will extract the IoT device identifier from the message and perform a lookup in the IoT device identifier database. If the IoT device identifier database contains the identifier of the IoT device, the IoT device is determined to be a 2G or 3G IoT device, and SCEF 102 sends a subscription request message to the HLR corresponding to the IoT device identified in the database lookup. If the IoT device identifier is not present in the in the IoT device identifier database, the IoT device is determined to be a 4G or 5G IoT device and the query is sent to the corresponding 4G or 5G network. It is understood that SCEF 102 may also maintain mappings between 4G and 5G IoT device identifiers and addresses for corresponding HSS, MME, or SGSN nodes in 4G or 5G networks.

It should also be noted that the IoT device identifiers in Table 2 may also include 4G or 5G IoT devices that are attached to a 2G or 3G network. The procedure illustrated in FIGS. 3 and 4 for subscribing to and receiving state information updates for IoT devices can be used for any IoT device whose information is stored in an HLR that responds to ATI messages. It should also be noted that the ATI procedure illustrated in FIGS. 3 and 4 can be used to subscribe to and obtain IoT device state information from an HSS or a combination HLR/HSS that will respond to ATI messages.

Returning to FIG. 4, based on the monitoring event type received in the monitoring subscription request, SCEF 102 inserts the requested info IE into MAP ATI request according to the mappings illustrated in Table 1. For example, for continuous location monitoring, the MAP ATI IEs may include the current location IE. If SCEF 102 does not recognize the monitoring event type received from SCS/AS 100, SCEF 102 may reject the monitoring event subscription with an error message indicating an error cause.

In line 3 of the message flow diagram, HLR 300 sends a MAP ATI Ack to SCEF 102 with the requested IoT device state information (if currently available). In line 4 of the message flow diagram, SCEF 102 sends a monitoring event subscription response to SCS/AS 100 with response code 201.

In line 5 of the message flow diagram, SCEF 102 sends a monitoring event status notification over the T8 interface to SCS/AS 100 indicating that the monitoring subscription was successful. In line 6 of the message flow diagram, SCS/AS 100 sends monitoring event status notification response to SCEF 102.

In this example, a static timer is configured on SCEF 102 to indicate the interval on which the continuous monitoring needs to be performed. At each expiration of the timer, SCEF 102 sends a MAP ATI request to HLR 300, one of which is indicated by line 7 of the message flow diagram. SCEF 102 may send the ATI request messages to HLR 300 on regular interval based on the statically configured value of the timer until the requested subscription duration or number of reports is reached. Once the requested subscription duration or number of reports is reached, SCEF 102 may cease sending the ATI request messages concerning the IoT device.

In line 8 of the message flow diagram, HLR 300 sends a MAP ATI Ack to SCEF 102 with the requested monitoring information. In line 9 of the message flow diagram, SCEF 102 sends the monitoring event status notification to SCS/AS 100 with the requested monitoring information over T8 interface. In line 10, SCS/AS 100 sends a monitoring event status notification response to SCEF 102.

Figure 5:
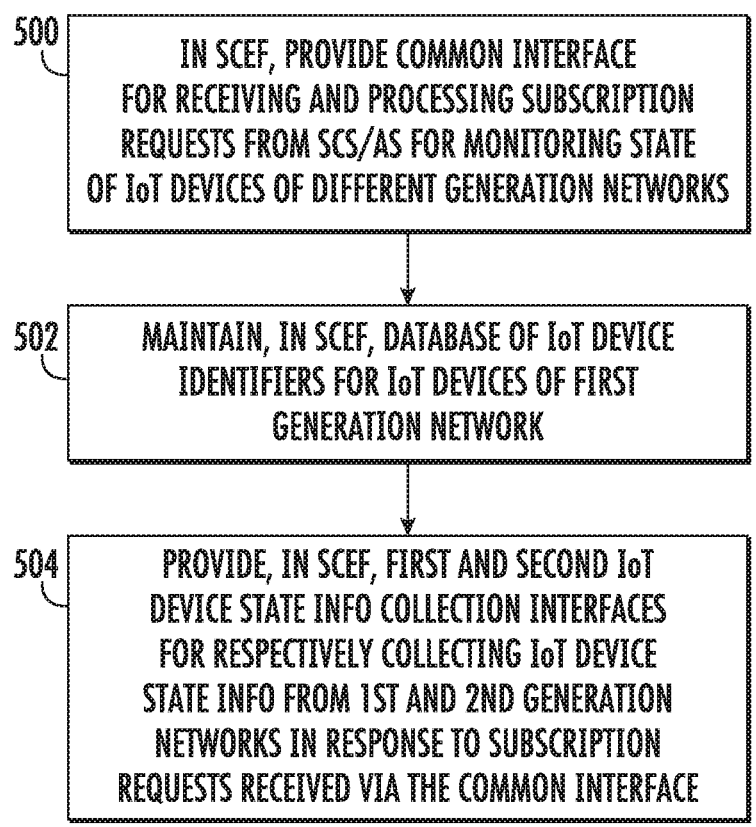
FIG. 5 is a flow chart illustrating an exemplary process for monitoring IoT device state for IoT devices of plural different generation networks.

FIG. 5 is a flow chart illustrating an exemplary process for monitoring IoT device state information for IoT devices of plural different generation networks. Referring to FIG. 5, in step 500, a common interface is provided in an SCEF for receiving subscription requests from IoT application servers for monitoring state of IoT devices of different generation networks. For example, referring to FIG. 6, SCEF 102 may be implemented as a standalone computing platform. SCEF 102 includes a first interface 600, which in the Illustrated example is a T8 interface, for receiving subscription request from IoT SCSs and ASs. The subscription requests may request IoT device state information for IoT devices of different generation networks. For example, the subscription requests may request 4G or 5G IoT device state information using the monitoring event procedure Illustrated in FIGS. 1 and 2. Other subscription requests may request IoT device state information regarding 2G or 3G IoT devices using the procedures Illustrated in FIGS. 3 and 4. Providing a single common interface for IoT application servers and service capability servers to subscribe to and receive IoT device state information for IoT devices of different generation networks eliminates the need for application servers and service capability servers to comply with multiple different interface types for requesting IoT device state information.

In step 502, the process includes maintaining, in the SCEF, a database of IoT device identifiers for IoT devices of a first-generation network. In one example, the first-generation network may be a 2G or 3G network that contains state information for IoT devices. Table 2 above illustrates an example of IoT device identifier database that may be maintained.

Figure 6:
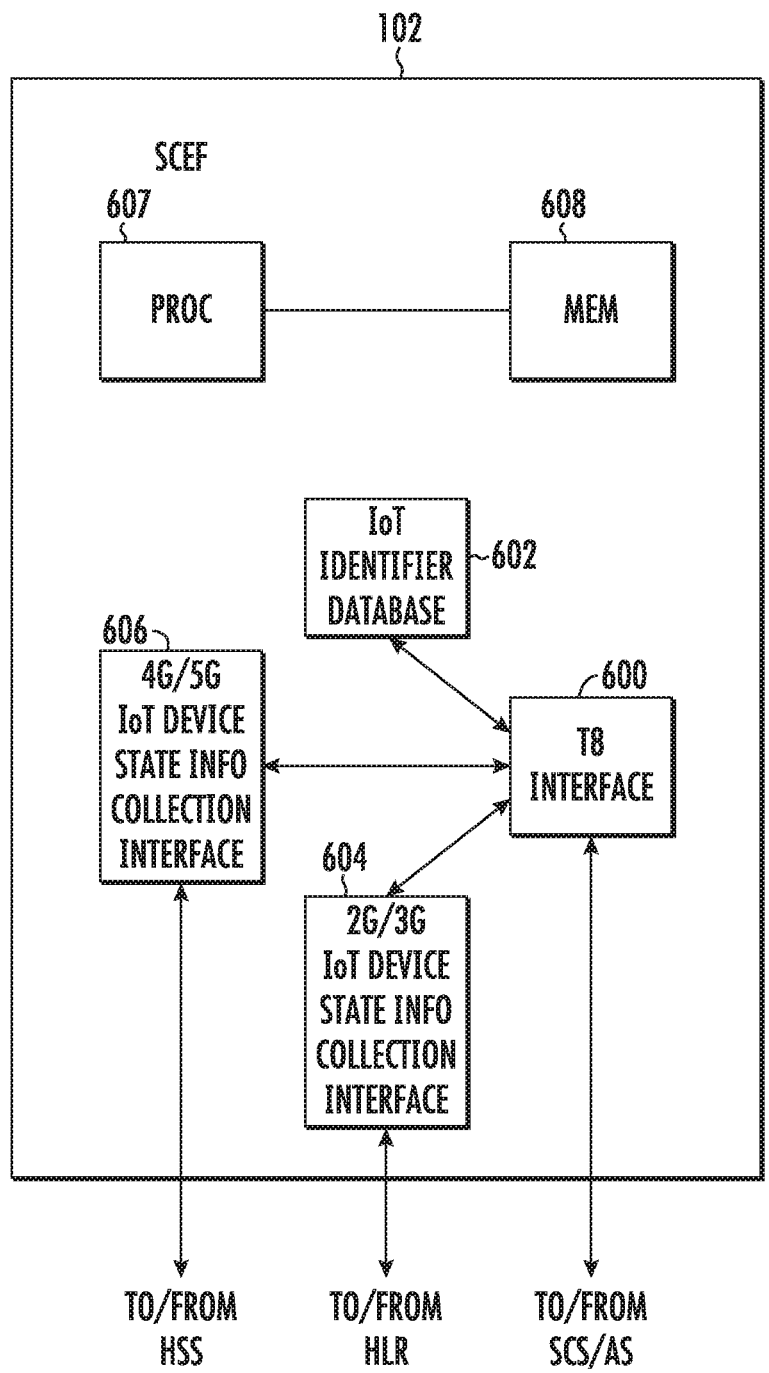
FIG. 6 is a block diagram of a standalone SCEF that provides a common interface for subscribing to receive IoT device state for IoT devices of plural different generation networks.

In step 504, the process includes providing, in the SCEF, first and second IoT device state information collection interfaces for respectively collecting IoT device state information from first- and second-generation networks in response to subscription requests received via the common interface. Referring to FIG. 6, SCEF 102 includes a 2G/3G IoT device state information collection interface 604 for collecting IoT device state information for 2G/3G IoT devices from an HLR and a 4G/5G IoT device state information collection interface 606 for collecting state information regarding 4G and 5G IoT devices. 2G/3G IoT device state information collection interface 604 may implement the above-described procedures for sending ATI messages for subscribing to receive IoT device state. ATI messages are MAP messages sent over SS7 networks. Thus, 2G/3G IoT device state information collection interface 604 may be an SS7 interface that implements a MAP layer, a transaction capabilities application part (TCAP) layer, a signaling connection control part (SCCP) layer, a message transfer part level 3 (MTP3) layer, and an IP or SS7 transport layer (either Sigtran over IP or SS7 layers 1 and 2). 4G/5G IoT device state information collection interface 606 may implement one or more Diameter layers for subscribing to and receiving IoT device state information from Diameter nodes, such as an HSS, an SGSN, or an MME. SCEF 102 also includes at least one processor 607 and a memory 608.

Figure 7:
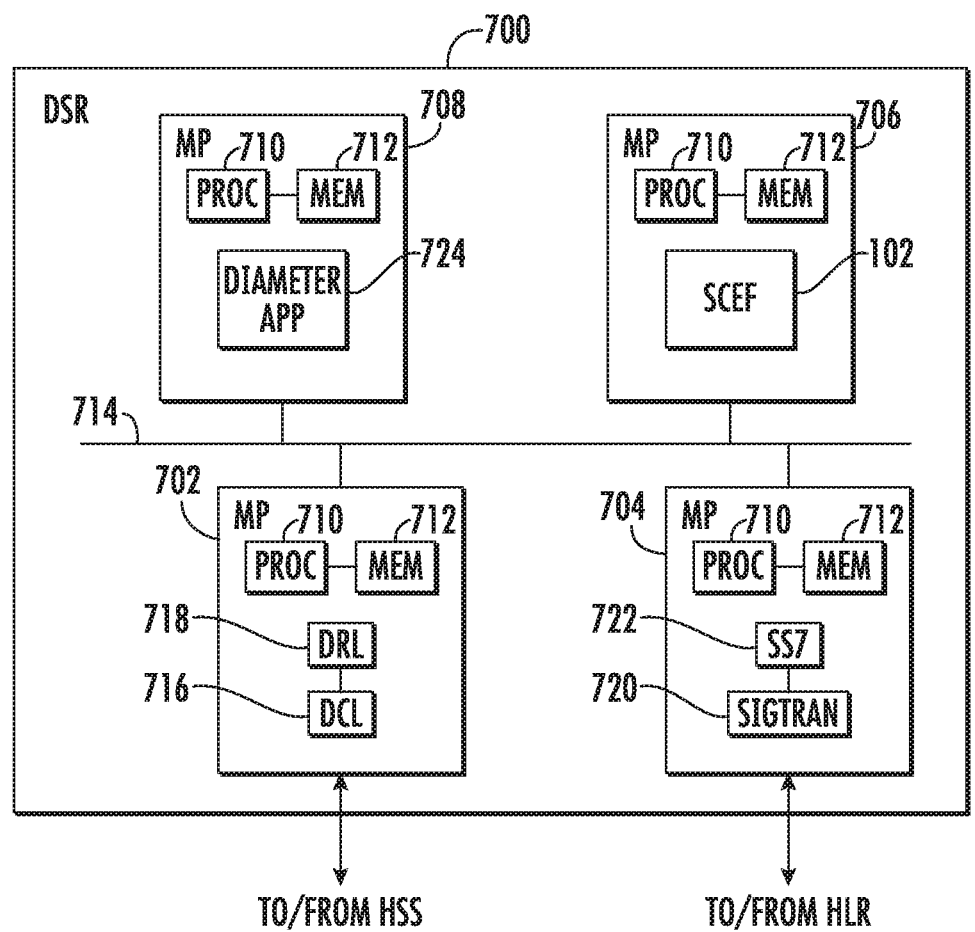
FIG. 7 is a block diagram of an SCEF that is a component of a Diameter signaling router, where the SCEF includes a common interface for allowing subscriptions to receive state information for IoT devices of plural different generation networks.

In the example Illustrated in FIG. 6, SCEF 102 is a standalone component. A standalone SCEF may include SCEF functionality in addition to SCS and AS functionality as well as MTC device interworking functionality. In an alternate implementation, SCEF 102 may be implemented as a component of a Diameter signaling router (DSR). FIG. 7 illustrates such an implementation. In FIG. 7, DSR 700 includes a plurality of message processors 702, 704, 706, and 708. Each message processor 702, 704, 706, and 708 includes a printed circuit board and at least one processor 710 and memory 712 mounted on the printed circuit board. Message processors 702, 704, 706, and 708 may exchange messages via a communications medium 714, such as an Ethernet backplane.

In the illustrated example, message processor 702 implements a Diameter connection layer 716 and a Diameter routing layer 718. Diameter connection layer 716 establishes and maintains Diameter connections with peer Diameter nodes. Diameter routing layer 718 routes Diameter messages based on Diameter layer information, such as destination host and destination realm parameters, in the messages.

Message processor 704 implements SS7 communications. As such, message processor 704 includes a Sigtran layer 720 and an SS7 layer 722. Sigtran layer 720 implements Sigtran protocols for carrying SS7 messages over IP networks. SS7 layer 722 implements SS7 MTP level 3 for routing SS7 signaling messages based on SS7 point codes.

Message processor 706 implements SCEF 102 and may include the components illustrated in FIG. 6. As such, for retrieving IoT device state information from a 2G or 3G network, SCEF 102 may send outbound subscription requests via SS7 message processor 704 and receive subscription information from SS7 message processor 704. For 4G and 5G IoT device state information, SCEF 102 may send subscription requests via Diameter message processor 702 and receive corresponding state information via Diameter message processor 702.

Message processor 708 implements a Diameter application 724. Diameter application 724 may be any suitable Diameter application, such as a Diameter firewall application, performance monitoring application, or other suitable Diameter application.

Figure 8:
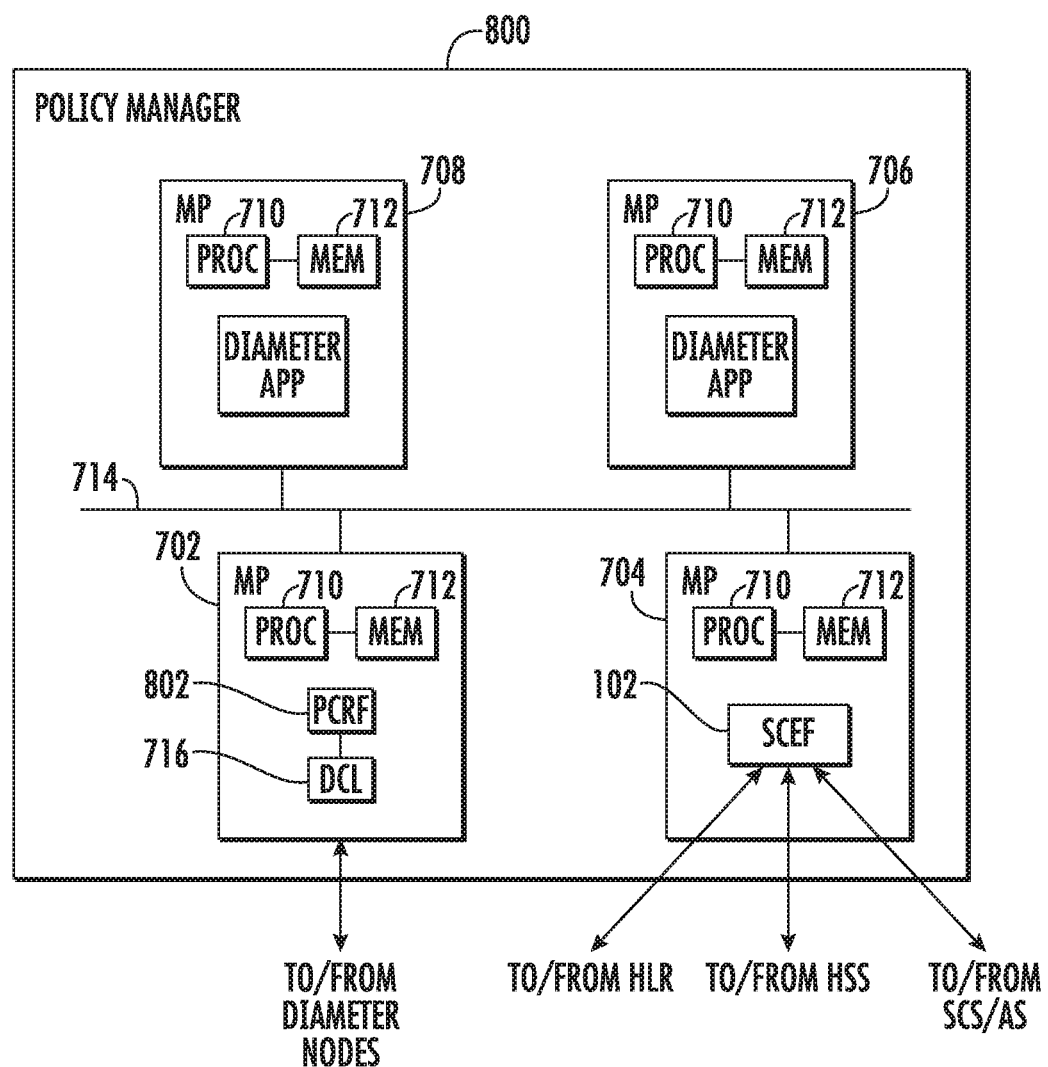
FIG. 8 is a block diagram of a policy server including an SCEF with a common interface for allowing subscription to receive updates in state information for IoT devices of plural different generation networks.

In the example illustrated in FIG. 7, SCEF 102 is component of DSR 700. In yet another alternate implementation, SCEF 102 may be a component of a policy manager. FIG. 8 illustrates such an implementation. In FIG. 8, policy manager 800 includes message processors 702, 704, 706, and 708 as illustrated in FIG. 7. Each message processor 702, 704, 706, and 708 includes a processor 710 and memory 712. Message processors 702, 704, 706, and 708 may communicate via communications medium 714. However, rather than implementing Diameter routing or only Diameter routing, message processor 702 illustrated in FIG. 8 includes a policy and charging rules function (PCRF) 802 that implements PCRF functionality. PCRF functionality includes responding to policy and charging requests from Diameter nodes. Message processor 702 also implements a Diameter connection layer 716 for establishing and maintaining connections with external Diameter nodes.

Message processor 704 implements the SCEF functionality Illustrated in FIG. 6. Briefly, such functionality includes receiving subscription requests for IoT device state information via a common interface, such as a T8 interface, and sending corresponding subscription requests to HLRs and HSSs. Message processors 706 and 708 may implement other Diameter applications such as policy related applications or non-policy related Diameter applications.

Thus, the SCEF that provides a common interface for multi-generation IoT device state monitoring can be implemented either as a standalone node or as a component of another node, such as a DSR or a PCRF. Such an SCEF obviates the need to provide dedicated interfaces to monitor IoT device state information for IoT devices of different generation networks. Such a device improves the technological field of IoT device state monitoring because SCS and AS vendors are not required to comply with requirements of different interfaces for monitoring IoT devices of different generation networks.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for monitoring Internet of things (IoT) device state, the method comprising:
   in a service capability exposure function (SCEF) implemented using at least one processor:
      providing a common interface for receiving subscription requests from IoT application servers (ASs) or service capability servers (SCSs) for monitoring state of IoT devices of plural different generation networks;
      maintaining, in the SCEF, a database of identifiers of IoT devices of a first-generation network;
      providing, in the SCEF, an interface to a subscriber data repository node of the first-generation network;
      receiving, via the common interface, a subscription request for subscribing to receive state information regarding an IoT device;
      performing a lookup in the database and identifying the subscription request as being associated with an IoT device registered in the first-generation network; and transmitting, via the interface to the first-generation network, a message to the subscriber data repository node for receiving state information regarding the IoT device.

2. The method of claim 1 wherein the common interface comprises a T8 interface, the first generation network comprises a 2G or 3G network, the T8 interface is further configured to receive subscription requests for state information regarding a 4G or 5G IoT device, and wherein the method further comprises, transmitting, via an interface to a second generation network, a message to a node in the second generation network for subscribing to receive state information regarding the 4G or 5G IoT device.

3. The method of claim 1 wherein providing the database includes providing a database indexed by mobile subscriber integrated services digital network (MSISDN) numbers or domain parts of external identifiers.

4. The method of claim 1 wherein the subscriber data repository node comprises a home location register (HLR).

5. The method of claim 1 wherein transmitting the message to the subscriber data repository node comprises transmitting an anytime interrogation (ATI) request message to the data repository node.

6. The method of claim 5 wherein the subscription request is a request for one-time monitoring and wherein the ATI request message includes an information element indicating one-time monitoring.

7. The method of claim 6 wherein the subscription request is a request for continuous monitoring and wherein the ATI request message includes an information element indicating continuous monitoring.

8. The method of claim 7 comprising maintaining a timer at the SCEF and periodically sending ATI request messages to the subscriber data repository node upon each expiration of the timer to effect the continuous monitoring.

9. The method of claim 1 comprising, receiving, at the SCEF, state information regarding the IoT device and providing the state information to the SCS or AS via the common interface.

10. The method of claim 1 wherein the SCEF comprises a standalone node or a component of a Diameter signaling router (DSR) or a policy server.

11. A system for monitoring Internet of things (IoT) device state, the system comprising:
a service capability exposure function (SCEF) including:
at least one processor;
a common interface for receiving subscription requests from IoT application servers (ASs) or service capability servers (SCSs) for monitoring state of IoT devices of plural different generation networks;
a database of identifiers of IoT devices of a first-generation network;
an interface to a subscriber data repository node of the first-generation network;
wherein the SCEF receives, via the common interface, a subscription request for subscribing to receive state information regarding an IoT device, performs a lookup in the database and identifying the subscription request as being associated with an IoT device registered in the first-generation network, and transmits, via the interface to the first-generation network, a message to the subscriber data repository node for receiving state information regarding the IoT device.

12. The system of claim 11 wherein the common interface comprises a T8 interface, the first generation network comprises a 2G or 3G network, the T8 interface is further configured to receive subscription requests for state information regarding a 4G or 5G IoT device, and wherein the SCEF further includes an interface to a second generation network and the SCEF transmits, via the interface to the second generation network, a message to a node in the second generation network for subscribing to receive state information regarding the 4G or 5G IoT device.

13. The system of claim 11 wherein the database is indexed by mobile subscriber integrated services digital network (MSISDN) numbers or domain parts of external identifiers.

14. The system of claim 11 wherein the subscriber data repository node comprises a home location register (HLR).

15. The system of claim 11 wherein the message transmitted to the subscriber data repository node comprises an anytime interrogation (ATI) request message.

16. The system of claim 15 wherein the subscription request is a request for one-time monitoring and wherein the ATI request message includes an information element indicating one-time monitoring.

17. The system of claim 16 wherein the subscription request is a request for continuous monitoring and wherein the ATI request message includes an information element indicating continuous monitoring.

18. The system of claim 17 wherein the SCEF maintains a timer and periodically transmits ATI request messages to the subscriber data repository node upon each expiration of the timer to effect the continuous monitoring.

19. The system of claim 11 wherein the SCEF receives state information regarding the IoT device and provides the state information to the SCS or AS via the common interface.

20. A non-transitory computer readable medium having stored thereon executable instructions that when executed by a processor of a computer controls the computer to perform steps comprising:
in a service capability exposure function (SCEF) implemented using at least one processor:
providing a common interface for receiving subscription requests from IoT application servers (ASs) or service capability servers (SCSs) for monitoring state of IoT devices of plural different generation networks;
maintaining, in the SCEF, a database of identifiers of IoT devices of a first-generation network;
providing, in the SCEF, an interface to a subscriber data repository node of the first-generation network;
receiving, via the common interface, a subscription request for subscribing to receive state information regarding an IoT device;
performing a lookup in the database and identifying the subscription request as being associated with an IoT device registered in the first-generation network; and
transmitting, via the interface to the first-generation network, a message to the subscriber data repository node for receiving state information regarding the IoT device.

* * * * *